C. R. HARVIN.
AUTOMATIC SCALE FOR WEIGHING COTTON SEED.
APPLICATION FILED OCT. 7, 1916.
1,248,324.
Patented Nov. 27, 1917.
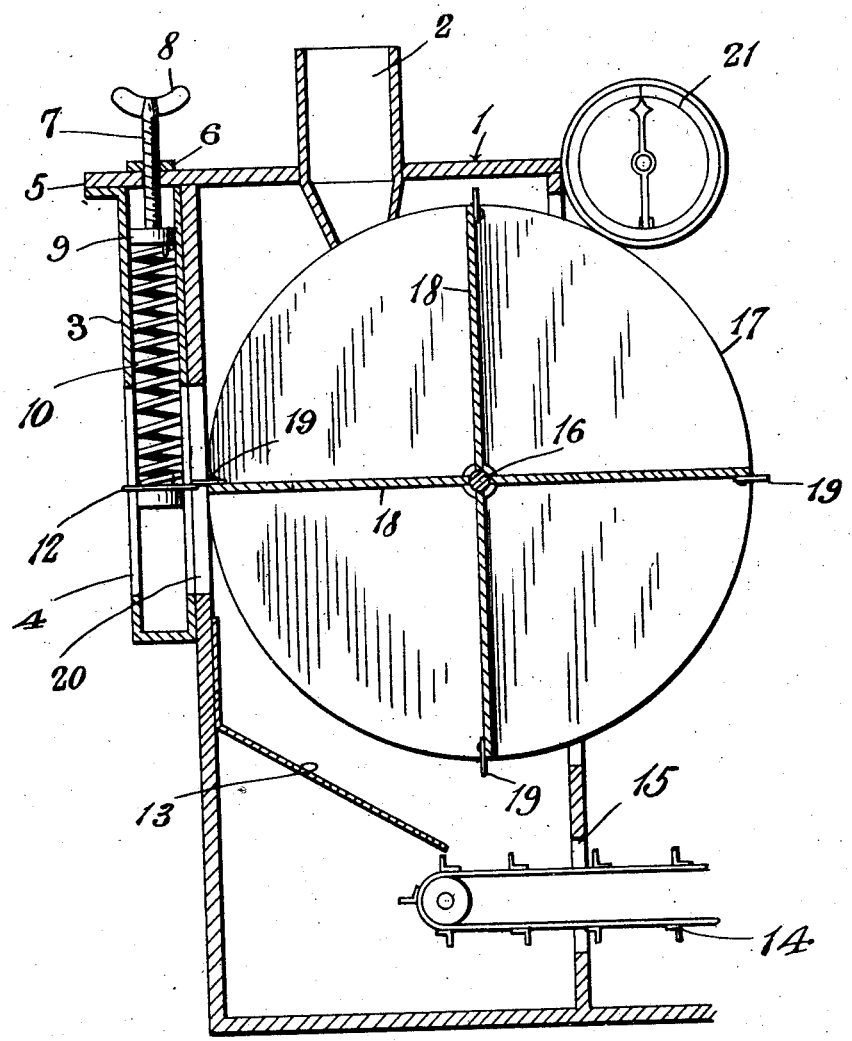

UNITED STATES PATENT OFFICE.

CHARLES R. HARVIN, OF MANNING, SOUTH CAROLINA.

AUTOMATIC SCALE FOR WEIGHING COTTON-SEED.

1,248,324.  Specification of Letters Patent.  Patented Nov. 27, 1917.

Application filed October 7, 1916. Serial No. 124,314.

*To all whom it may concern:*

Be it known that I, CHARLES R. HARVIN, a citizen of the United States, residing at Manning, in the county of Clarendon and State of South Carolina, have invented certain new and useful Improvements in Automatic Scales for Weighing Cotton-Seed; and I do hereby declare the following to be a full, clear, and exact description of the invention, such as will enable others skilled in the art to which it appertains to make and use the same.

This invention relates to a weighing scale and has for its primary object the provision of means for weighing and recording cotton seed as it is received from a cotton gin before passing into a cotton seed storing house or wagon, to obviate all dissatisfaction that may arise between the ginner and the customer and which also obviates the weighing of a wagon first before loading and after being loaded to determine the weight of the cotton seed.

Another object of this invention is to provide a seed receiving chamber having means located therein for weighing the seeds as they are received from the cotton gin and which will automatically deposit the seeds after being weighed upon the conveyer to be carried either to a storehouse or wagon.

A further object of this invention is to provide a plurality of radially arranged blades rotatably mounted within the seed receiving chamber adapted to each pass under a hopper to receive cotton seeds therefrom and remain stationary by a tension means until a desired weight is obtained and which will automatically deposit the weighed seeds upon a conveyer to be carried to a wagon or storehouse.

A further object of this invention is to provide means for adjusting the tension means, whereby different weights may be had when desired.

A still further object of this invention is the provision of an automatic scale for weighing cotton seeds of the above stated character, which shall be simple, durable and efficient, and which may be manufactured and sold at a comparatively low cost.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawing, in which:—

The figure is a vertical sectional view of an automatic scale for weighing cotton seeds, constructed in accordance with my invention.

Referring in detail to the drawing, the numeral 1 indicates a casing having secured through its top wall thereof a hopper 2 for receiving cotton seeds from a cotton gin. A cylindrical member 3 is secured to the casing 1 and has a pair of oppositely disposed elongated slots 4 adjacent its lower end. An extension 5 is formed on the top of the casing 1 and overlies the cylindrical member 3 and is provided with a boss 6 having an internally screw threaded opening to receive a screw threaded bolt 7 to which is secured a wing nut 8. The screw threaded bolt extends downwardly in the cylindrical member 3 and has secured to its lower end a disk 9 which bears upon a coil spring 10 located within the cylindrical member 3. A disk 11 is secured to the lower end of the spring 10 and has secured thereto an extension 12 which projects through both of the elongated slots 4 of the cylindrical member 3.

An inclined false bottom 13 is secured within the casing 1 and it terminates adjacent its lower end thereof and directly over an inlet conveyer 14 entering the casing 1 by means of an opening 15. A shaft 16 is journaled within the casing 1 and has mounted upon each end thereof disks 17 which are bolted or otherwise secured to the casing 1 to hold them against rotation. A plurality of radially arranged blades 18 are secured to the shaft and each have secured to the free ends thereof a spring catch 19. The casing 1 has an elongated slot 20 in registration with one of the oppositely disposed elongated slots 4 of the cylindrical member 3 to allow the spring catches upon the blades 18 to extend outwardly of the housing 1 to engage the extension 12 upon the disk 11. As the cotton seed is received from the cotton gin into the hopper 2, it passes through the hopper upon one of the blades 18 directly below same and the cotton seeds accumulate thereon until the weight of same overcomes the tension of the spring forcing the blade 18 to move downwardly, thereby depositing the cotton seeds accumulated thereon upon the inclined false bottom 13, thence they slide downwardly upon the conveyer 14 and are conveyed to a wagon or storehouse.

To regulate the weighing action of the device, the bolt 7 may be moved upwardly and downwardly within the casing, causing the spring 10 and disk 11 to move accordingly and thereby changing the position of the extension 12. To change the device to weigh less, the extension 12 is moved downwardly in the slot of the casing 3, limiting the distance which the disk and extension have to move before the respective blades 18 will become freed therefrom and permit it to dump the seed upon the chute 13.

From the foregoing description taken in connection with the accompanying drawing, it will readily be seen that this device operates entirely automatically and continuously as long as the cotton seeds are fed into the hopper 2.

Secured to the casing 1 and upon one side thereof is a recorder 21 which may be of any desired construction and is adapted to be operated by the spring catches 19 upon the blades 18 as as they are rotated, thus recording the weight of the cotton seeds as the device operates.

While I have shown and described the preferred embodiment of my invention, it will be understood that minor changes in construction, combination and arrangement of parts may be made without departing from the spirit and scope of the invention as claimed.

Having thus described my invention, what I claim is: —

In a device of the character set forth comprising a casing having a slot in one side thereof, blades journaled in said casing, means for conveying seeds through the blades, catches secured to the blades and adapted to extend through the slot upon rotation thereof, a vertically disposed cylindrical member secured to the casing and having a slot in registration with the slot of the casing to receive the catches, a bolt adjustably mounted in the member, a spring connected to said bolt, a disk secured to the spring and slidably mounted in the member and adapted to be moved in various locations by the bolt for regulating the weighing action of the device, and extensions carried by said disk and adapted to engage the catches.

In testimony whereof I affix my signature in presence of two witnesses.

CHARLES R. HARVIN.

Witnesses:
F. O. RICHARDSON,
T. M. MUNZON.

Copies of this patent may be obtained for five cents each, by addressing the "Commissioner of Patents, Washington, D. C."